United States Patent [19]

Pilc et al.

[11] Patent Number: 5,510,777
[45] Date of Patent: Apr. 23, 1996

[54] METHOD FOR SECURE ACCESS CONTROL

[75] Inventors: Randolph J. Pilc, Holmdel; Roy P. Weber, Bridgewater, both of N.J.

[73] Assignee: AT&T Corp., Murray Hill, N.J.

[21] Appl. No.: 174,579

[22] Filed: Dec. 28, 1993

Related U.S. Application Data

[63] Continuation of Ser. No. 763,725, Sep. 23, 1991, abandoned.

[51] Int. Cl.$^6$ .............................. H04Q 1/00; G06F 7/04
[52] U.S. Cl. .............................. 340/825.310; 340/825.3; 379/95
[58] Field of Search ......................... 340/825.30, 825.31, 340/825.34, 825.06, 825.07, 825.15; 379/95, 200, 62; 235/380

[56] References Cited

U.S. PATENT DOCUMENTS

| | | | |
|---|---|---|---|
| 3,976,840 | 8/1976 | Cleveland et al. ...................... | 379/95 |
| 4,481,384 | 11/1984 | Matthews ................................. | 179/18 |
| 4,756,020 | 7/1988 | Fodale .................................... | 379/112 |
| 4,816,653 | 3/1989 | Anderl et al. .......................... | 235/380 |
| 4,893,330 | 1/1990 | Franco .................................... | 379/91 |
| 4,896,346 | 1/1990 | Belfield et al. ......................... | 379/88 |
| 5,127,043 | 6/1992 | Hunt et al. .............................. | 379/88 |

*Primary Examiner*—Brian Zimmerman
*Attorney, Agent, or Firm*—Eugene J. Rosenthal

[57] ABSTRACT

A requester making a request for access to a destination is prompted to supply additional authentication information, beyond that which may be supplied by the requester in an attempt to meet a first level of security processing specified by the nature of the request itself, only if it is determined from a predetermined set of attributes of the particular access request that additional security processing is necessary before access can be granted to the destination.

13 Claims, 10 Drawing Sheets

100

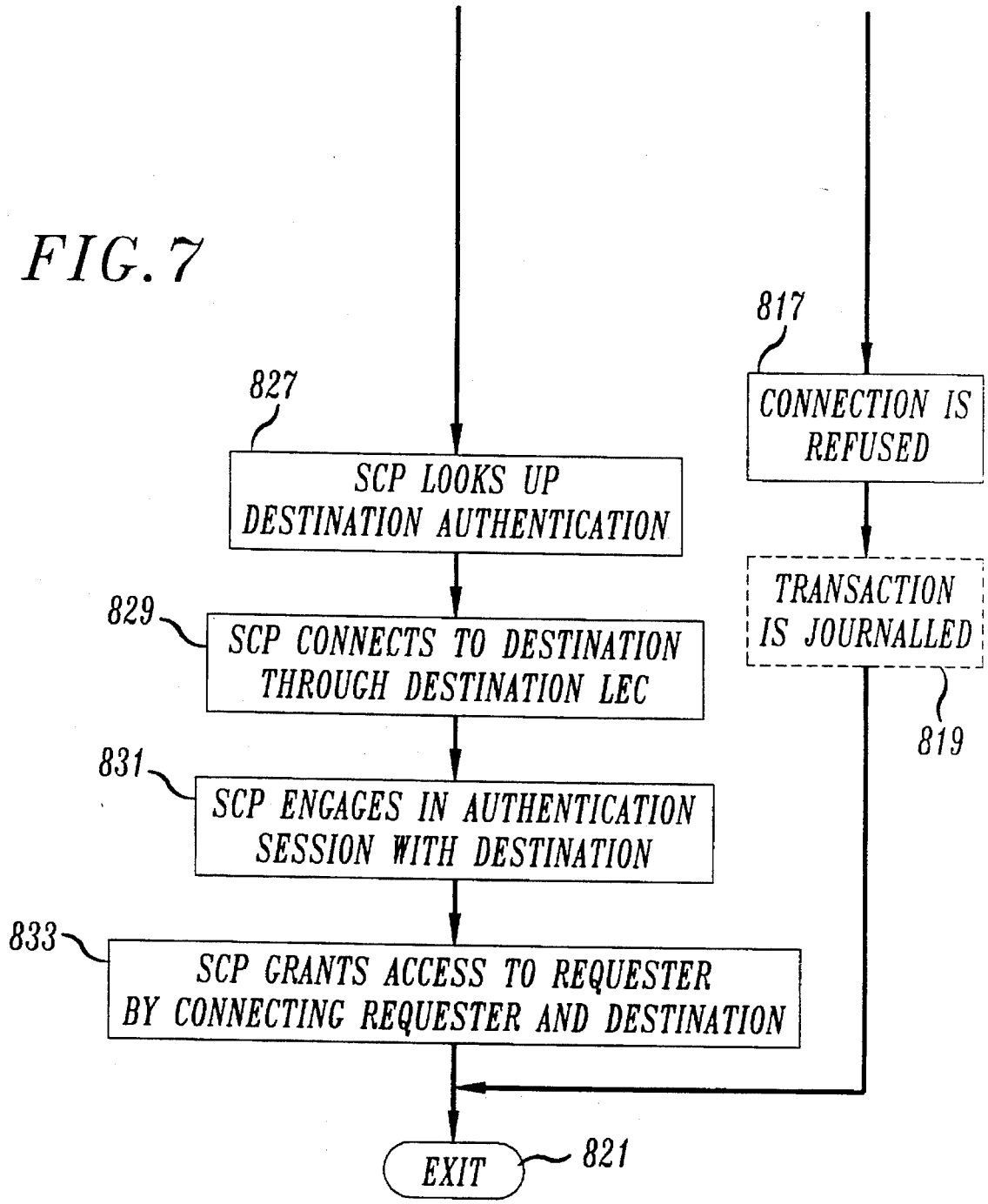

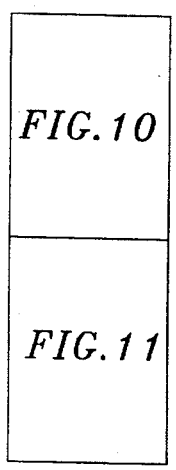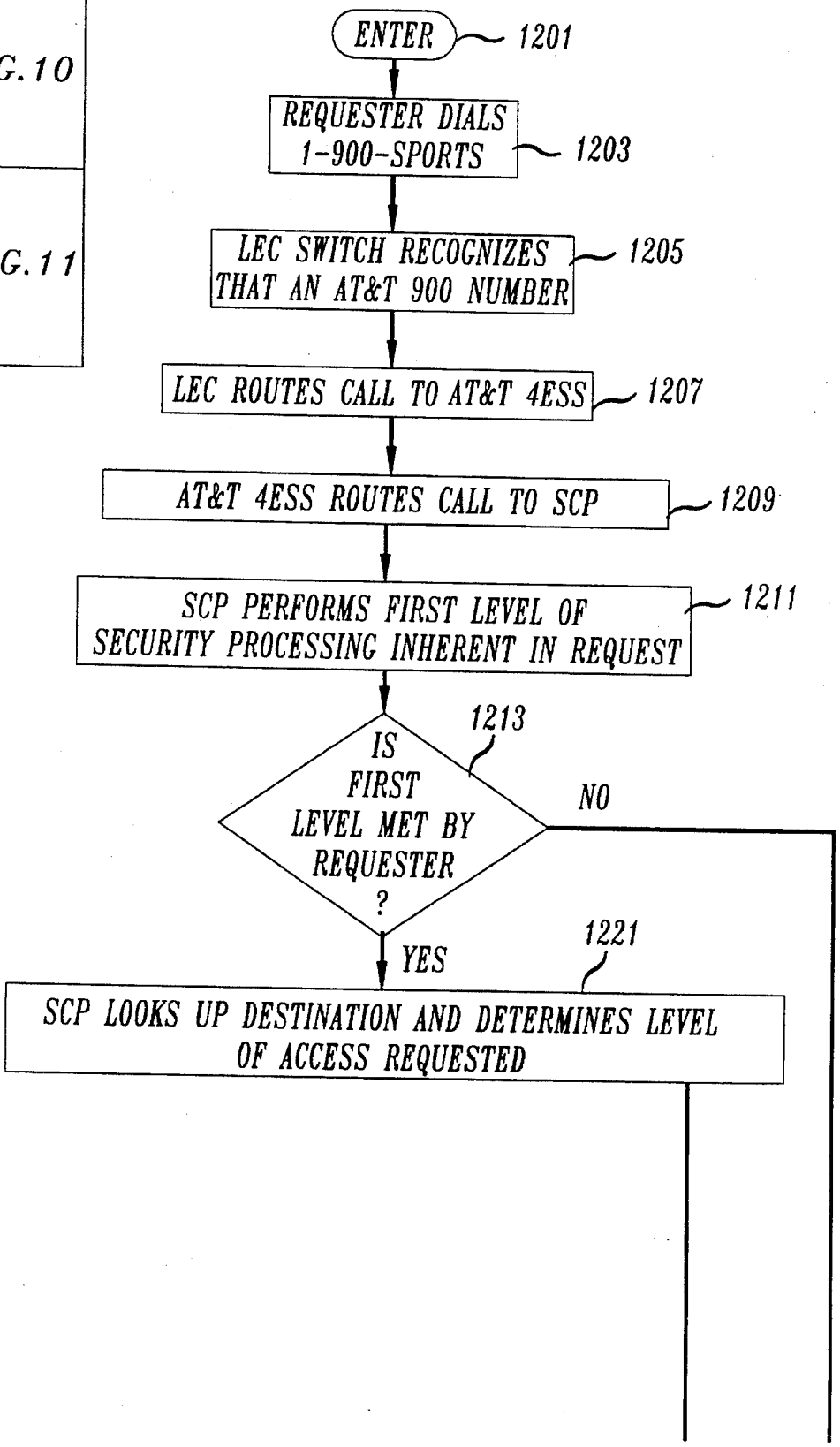

METHOD FOR SECURE ACCESS CONTROL

This application is a continuation of application Ser. No. 07/763,725, filed on Sep. 23, 1991 now abandoned.

CROSS-REFERENCE TO RELATED APPLICATION

U.S. patent application Ser. No. 07/763,718, filed on Sep. 23, 1991 and now U.S. Pat. No. 5,276,444, was filed concurrently herewith.

TECHNICAL FIELD

This invention relates to security systems that regulate access to systems or locations and, more particularly, where access may be sought by multiple authorized users to a plurality of such systems or locations.

BACKGROUND OF THE INVENTION

Only those individuals authorized to have access to any particular system or location, referred to herein as "destinations", should be granted such access. Indeed today, many destinations may be remotely accessed via telecommunications. Typical remotely accessible destinations include remote telephones, systems that provide access to credit, and value-added telecommunications services. On a regular basis, a large number of authorized individuals must authenticate their identity, i.e., to confirm that the person requesting the access is actually who he alleges that he is, to several destinations to which access is sought.

For actually authenticating the identity of an access requester, prior systems have employed representations of various different identifying characteristics of a person. These characteristics are used, either individually or in combination, to confirm that the person requesting the access is actually who he alleges that he is. Identifying characteristics that have been employed include: voice samples, fingerprints, retina patterns, personal appearance, handwriting and even the manner in which a wave is polarized as it passes through a portion of the body. These representations are known as authentication information. One method employed to obtain such an alleged identity is to require the requester to enter some type of a code which may include a predetermined personal identification number (PIN). This code may be typed in via a keypad or scanned from a device in the requester's possession, e.g., a credit card having a magnetically encoded version of the code. The prior systems then attempt to authenticate the requester by comparing a previously stored representation of at least one identifying characteristic of the authorized user whose identity has been alleged with a representation of the same identifying characteristic that is derived from measurements taken from the requester during the access request process. If the requester is authenticated, access is granted; otherwise, access is denied.

In each such prior system the level of security processing required before access can be granted is inherent in the nature of the request, i.e., all requests of the same form invoke the same level of security processing. For example, 800-type calls require no security processing while calls billed to credit cards always require that a valid identification number be supplied so the call may be appropriately billed. Requests of a type that always require that the measurement of the identifying characteristics be taken as part of this first level of security processing prior to granting any form of access are burdensome to requesters who are authorized users. This burdensome level of security may be unnecessary or of little value in many circumstances. Additionally, such security measures can result in an authorized requester being unable to obtain access. This can result if the requester is temporarily unable to supply the required identifying characteristic, e.g., if the identifying characteristic is a fingerprint and the requester has a large cut on his finger or if the identifying characteristic is a voice sample and the requester has nasal congestion. Blocking access to such an authorized requester is undesirable because it causes requester frustration and prevents a desired transaction from occurring. Such undesirability is exacerbated where the access is desired in a context in which fraudulent access is rarely sought or when other reasons make the value of the access check less significant.

SUMMARY OF THE INVENTION

The difficulties with prior access authorizing systems are overcome, in accordance with the principles of the invention, by receiving from a requester a request for access to a destination, the nature of the request itself specifying a first level of security processing, and prompting the requester to supply additional authentication information, beyond that which may be supplied by the requester in an attempt to meet the first level of security processing, only if it is determined from a predetermined set of attributes of the particular access request that additional security processing is necessary before access can be granted to the destination.

One important attribute of any request is the alleged identity of the requester. In the telephone context, examples of further attributes of a request include: originating and destination countries; per unit cost of the call; and type of originating station, e.g., private or public telephone. In the context of banking transactions, further attributes include: type of transaction, e.g., balance inquiry or withdrawal, or dollar value of the transaction if a withdrawal.

In a particular embodiment, if the first level of security processing has already been met and the values of the attributes are such that additional authentication information is not to be requested, then a first level of access is granted. On the other hand, if the values of the attributes are such that additional authentication information is required, then access will not be granted unless such information is obtained. If the requested authentication information is supplied, that information may then be used, along with the request attributes, in an attempt to authenticate the alleged identity of the requester in accordance with the requirements specified by the necessary additional security processing. If the requester is authenticated, access is granted.

A further feature of the invention is that different levels of access may be granted, depending upon a) the actual values of the set of attributes for the access request and b) the additional authentication information supplied, if requested. Thus, in order to be granted increasingly greater levels of access, various different attributes and requests for various different authentication information may be involved.

In accordance with another feature of the invention, such requesting and authentication may also be invoked iteratively, until the access desired by the requester is either granted or denied or there is no further information which may be obtained from the requester. This iteration may be performed with or without the knowledge of the requester.

In accordance with a further feature of the invention, rather than allowing only a single individual to be associated with each alleged requester identity, multiple individuals may be associated with a single alleged requester identity. If authentication is invoked for the alleged identity, any of the associated individuals, if recognized, may be granted access. The type of access granted to each associated individual can be made further dependent upon a recognition of which of the individuals they are and a profile specifically associated with that individual.

BRIEF DESCRIPTION OF THE DRAWING

In the drawing:

FIGS. 5, 6 and 7, when arranged as shown in FIG. 8, depict in flow chart form, an exemplary method of processing an access request by a requester to a destination where the security requirements for the granting of access is specified by the destination;

FIGS. 10 and 11, when arranged as shown in FIG. 12, depict in flow chart form, an exemplary access request by a requester to a destination where the security requirements for the granting of access is specified by the requester or the network operators.

DETAILED DESCRIPTION

Figure 1:
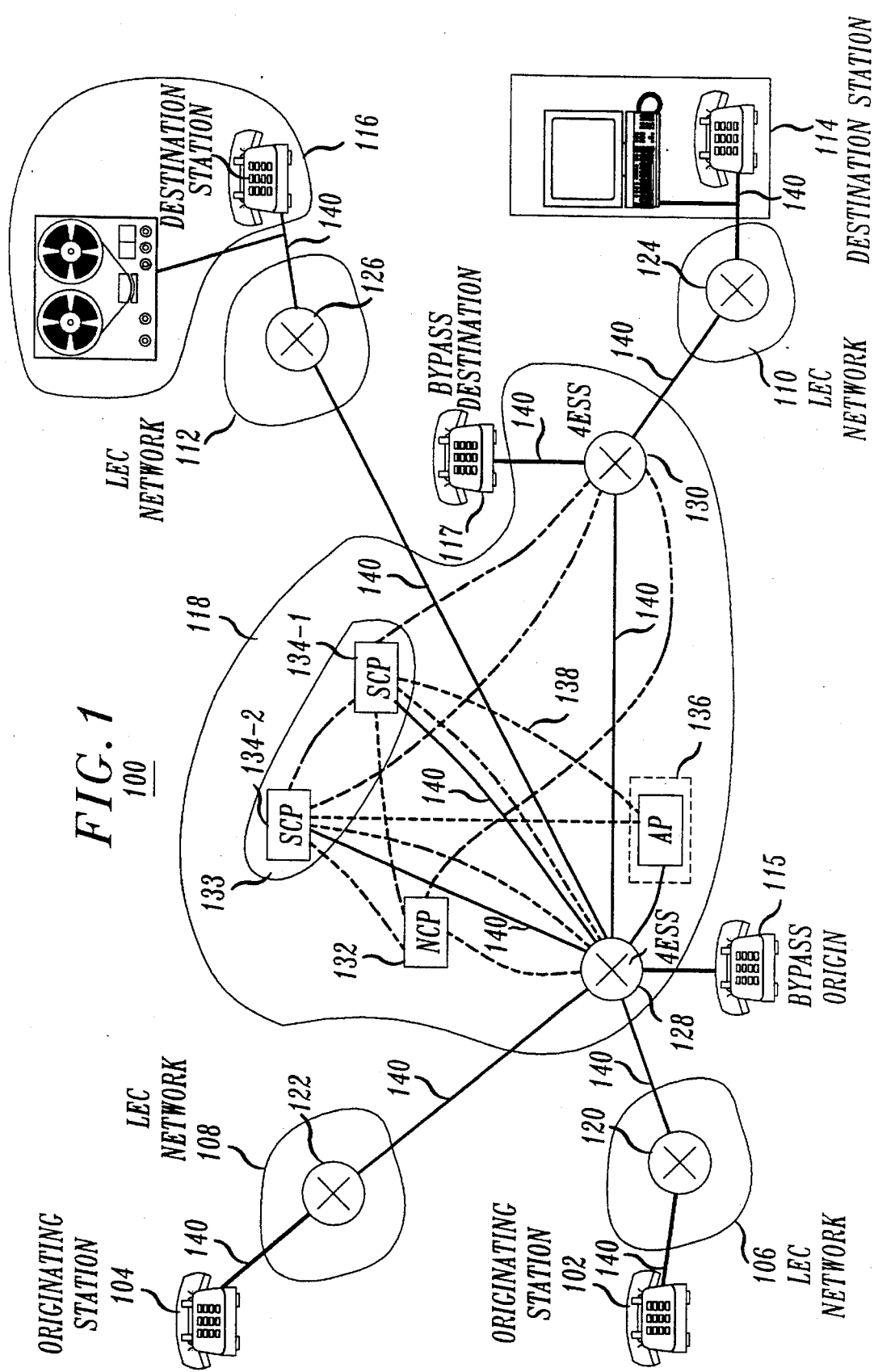
FIG. 1 shows, in simplified form, an exemplary telephone network embodying the principles of the invention.

Shown in FIG. 1, in simplified form, is exemplary telephone network 100 embodying the principles of the invention. Telephone network 100 comprises originating stations 102 and 104, local exchange carrier (LEC) networks 106, 108, 110 and 112, destination stations 114 and 116, bypass origin 115, bypass destination station 117 and long distance network 118, illustratively the AT&T network. Originating stations 102 and 104, destination stations 114 and 116, bypass origin 115 and bypass destination station 117 are representative of a plurality of network endpoints, the remainder of which are not shown for clarity of exposition. Only those portions of telephone network 100 necessary for calls to be made from an origin to a destination are shown.

LEC networks 106, 108, 110 and 112 contains switching machines 120, 122, 124, 126, respectively. Switching machines 120, 122, 124, 126 are capable of connecting a plurality of network endpoints to long distance network 118. Such switching machines are well known and may be, for example, AT&T's 5ESS® switch. Long distance network 118 comprises switching machines 128 and 130, network control point (NCP) 132, central security control system (security system) 133 and optional adjunct processor (AP) 136. NCP 132 is of a type well known in the art. Switching machines employed in communications networks are well known. Switching machines 128 and 130 are illustratively AT&T's No. 4 ESS™ switch. Additionally, security system 133 comprises security control points (SCP) 134-1 and SCP 134-2.

Switching machines 128 and 130, NCP 132, security system 133 and AP 136 are interconnected in the manner shown by signaling network 138, represented by dashed lines. Originating stations 102 and 104, destination stations 114 and 116, bypass destination station 117, switching machines 120, 122, 124, 126, switching machines 128 and 130 and SCPs 134 are interconnected by information links 140, in the manner shown. Information links 140 are of the well known types in the art for interconnecting communicating apparatus and can carry at least voice, data and video. Each of information links 140 need not have the same capacity. A typical implementation would comprise a mix of conventionally known digital transmission links, e.g., DS0, DS1 and DS3, provisioned in accordance with the needs of the network providers.

Figure 2:
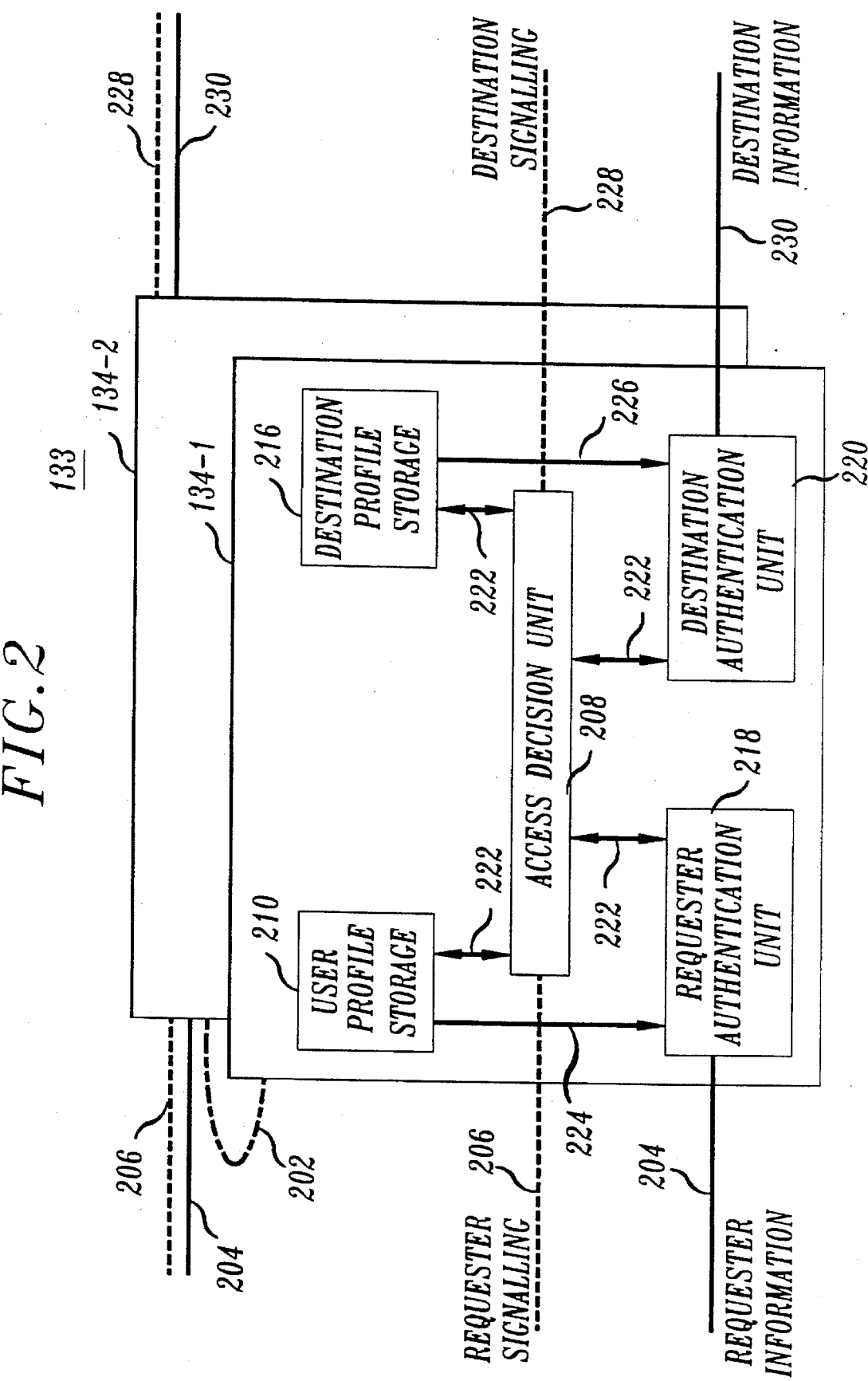
FIG. 2 shows an exemplary central security control system used in the network of FIG. 1.

Shown in FIG. 2 is a more detailed view of exemplary security system 133. In the manner shown, security system 133 comprises security control points (SCPs) 134, including security control point (SCP) 134-1 and SCP 134-2 which are networked together by link 202. Link 202 is part of signalling network 138 (FIG. 1). In this embodiment, each of SCPs 134 contains identical copies of all the information required to provide security operations. This interconnection pattern among the SCPs 134 of security system is arranged to provide fully redundant operation. Such an interconnection arrangement may be used to provide load balancing, which reduces waiting time for security processing, as well as providing backup in the case of failure of one of SCPs 134. Alternative embodiments may arrange the interconnection of SCPs 134 so as to allow partitioning of the information required to be stored in security system 133 among each one of SCPs 134. Such partitioning will be discussed further below.

SCP 134-1 and 134-2 are both connected to switching machine 128 by at least one requester information path 204 and at least one destination information path 230, which are each carried over the respective ones of information links 140 that interconnect each of SCPs 134 and switching machine 128. Each connection of a requester to one of SCPs 134 may be routed through a plurality of switching machines until it reaches the appropriate one of SCPs 134 that will handle the request. Each of SCP 134-1 and SCP 134-2 are also connected via at least one requester signalling link 206 and at least one destination signalling link 228, at least indirectly, to NCP 132, switching machines 128 and 130 and AP 136. Each signalling message for the one of SCPs 134 that is to be associated with a call may pass through several NCP 132 (not shown) or SCPs 134 via signalling network 138 (FIG. 1). Signalling links 206 and 228 are part of signaling network 138.

Each of SCPs 134 includes access decision unit 208 which communicates with user profile storage unit 210, destination profile storage unit 216, requester authentication unit 218 and destination authentication unit 220 over bidirectional links 222. Links 222 need not be of identical type. They may include, at the implementor's discretion, well known links such as: serial links, parallel links, shared memory, or a common bus such that a plurality of elements connected to access decision unit 208 by links 222 share a link 222. Requester authentication unit 218 is also interconnected with user profile storage unit 210 by link 224 and destination authentication unit 220 is interconnected to destination profile storage unit 216 by link 226. In this embodiment, it is access decision unit 208 that is connected to requester signaling link 206 and destination signaling link 228. This may be achieved via communication interfaces (not shown) which may be employed in access decision unit 208. Requester authentication unit 218 is connected to requester information path 204 and destination authentication unit 220 is connected to destination information path 230.

Figure 3:
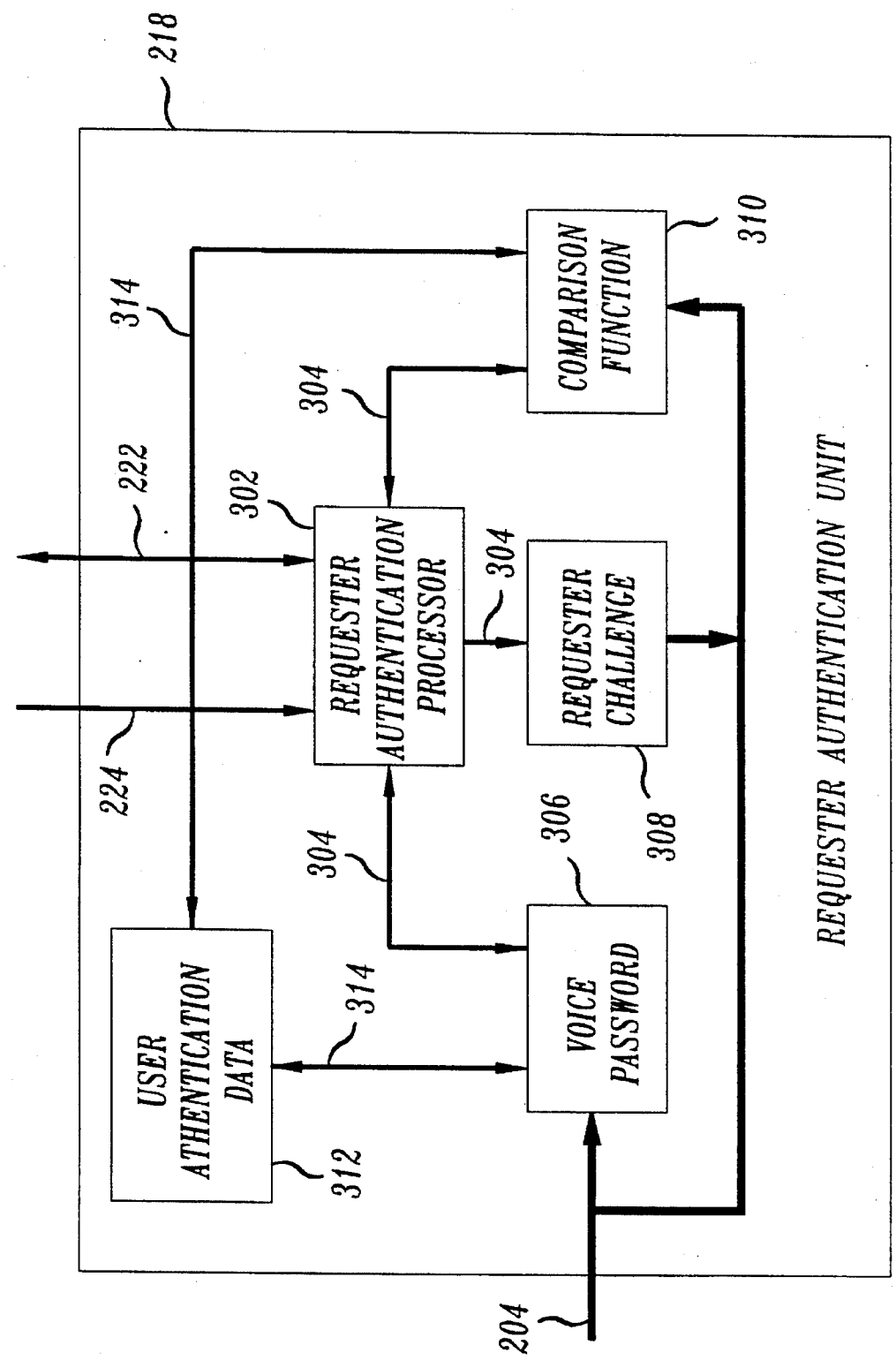
FIG. 3 depicts an expanded view of an exemplary requester authentication unit shown in the central security control system of FIG. 2.

FIG. 3 depicts an expanded view of an exemplary requester authentication unit 218. Requester authentication unit 218 includes requester authentication processor 302 which is connected to voice password 306, requester challenge 308 and comparison function 310 via links 304. Voice password 306, requester challenge 308 and comparison function 310 are also interconnected to requester information path 204. User authentication data 312 is interconnected to voice password 306 and comparison function 310 via links 314. In similar fashion as links 222, each of links 304 or 314 need not be of identical type. Links 222 and 224 connect requester authentication processor 302 to access decision unit 208 and user profile storage unit 210, respectively.

Figure 4:
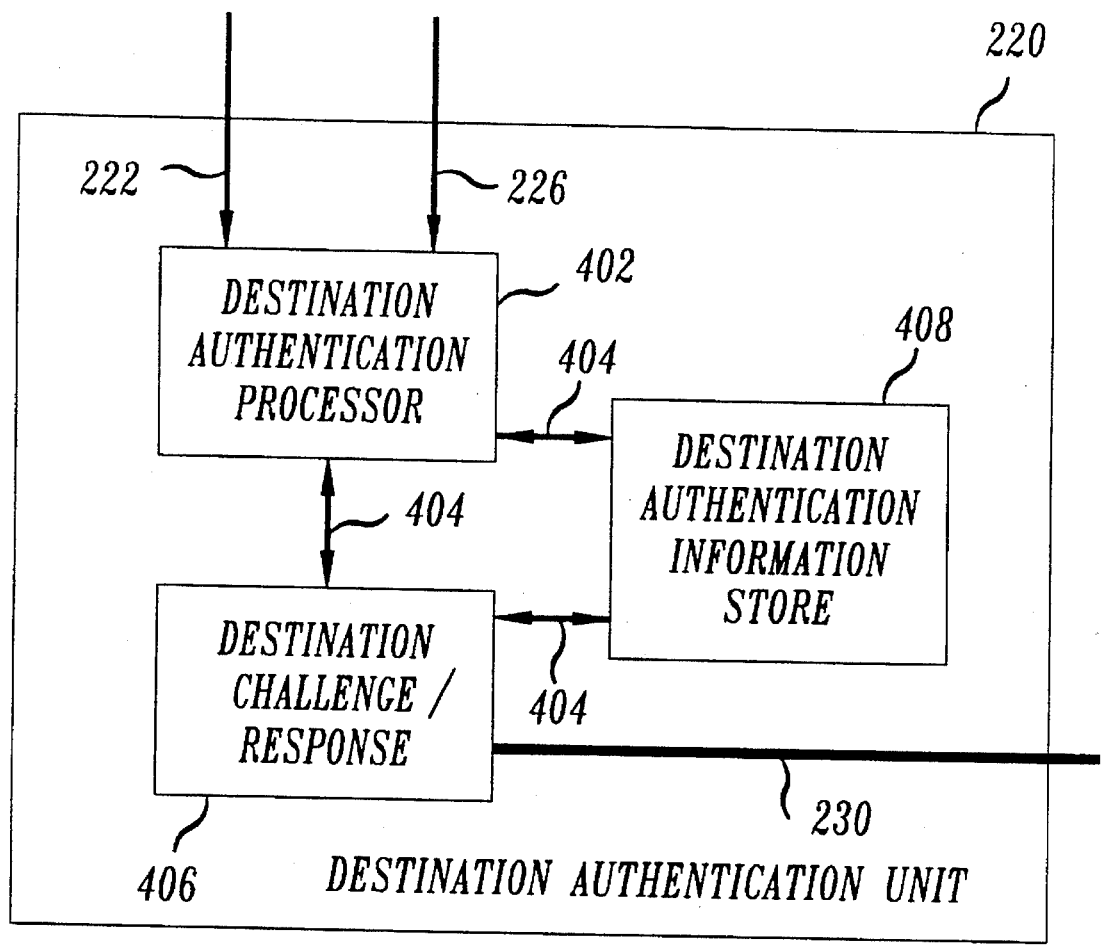
FIG. 4 shows an expanded view of an destination authentication unit 220 shown in the central security control system of FIG. 2.

An expanded view of destination authentication unit 220 is shown in FIG. 4. Links 222 and 226 from access decision unit 208 and destination profile storage 216, respectively are interconnected to destination authentication processor 402. In turn, destination authentication processor 402 is interconnected by links 404 to destination challenge response 406 and destination authentication information store 408. Destination challenge response 406 interfaces with destination authentication information store 408 via one of links 404 and with destination information path 230. It is noted that each element of FIGS. 2, 3 and 4 may be implemented as either hardware, software or a combination thereof, at the implementor's discretion.

Figure 5:
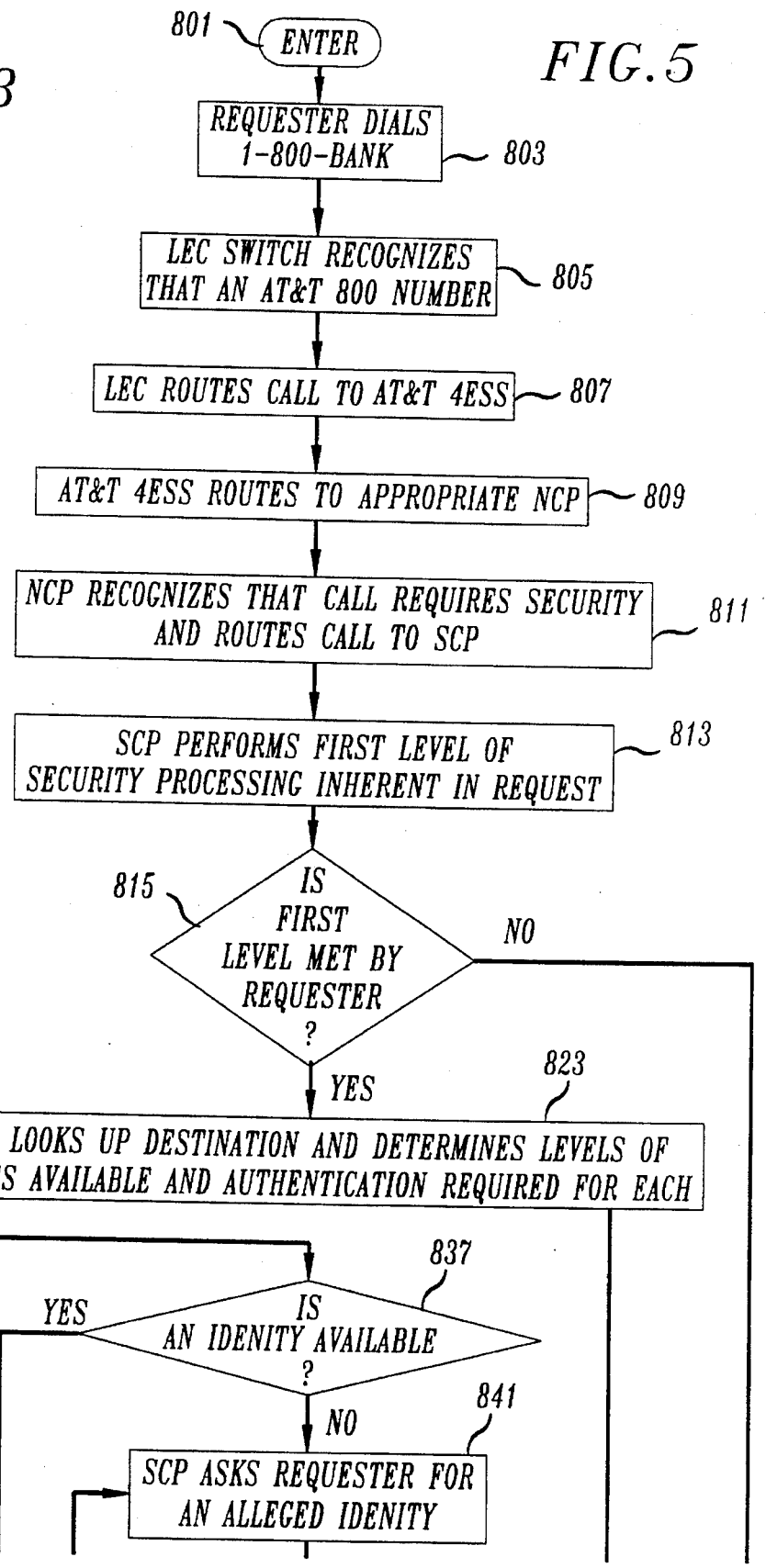
Figure 6:
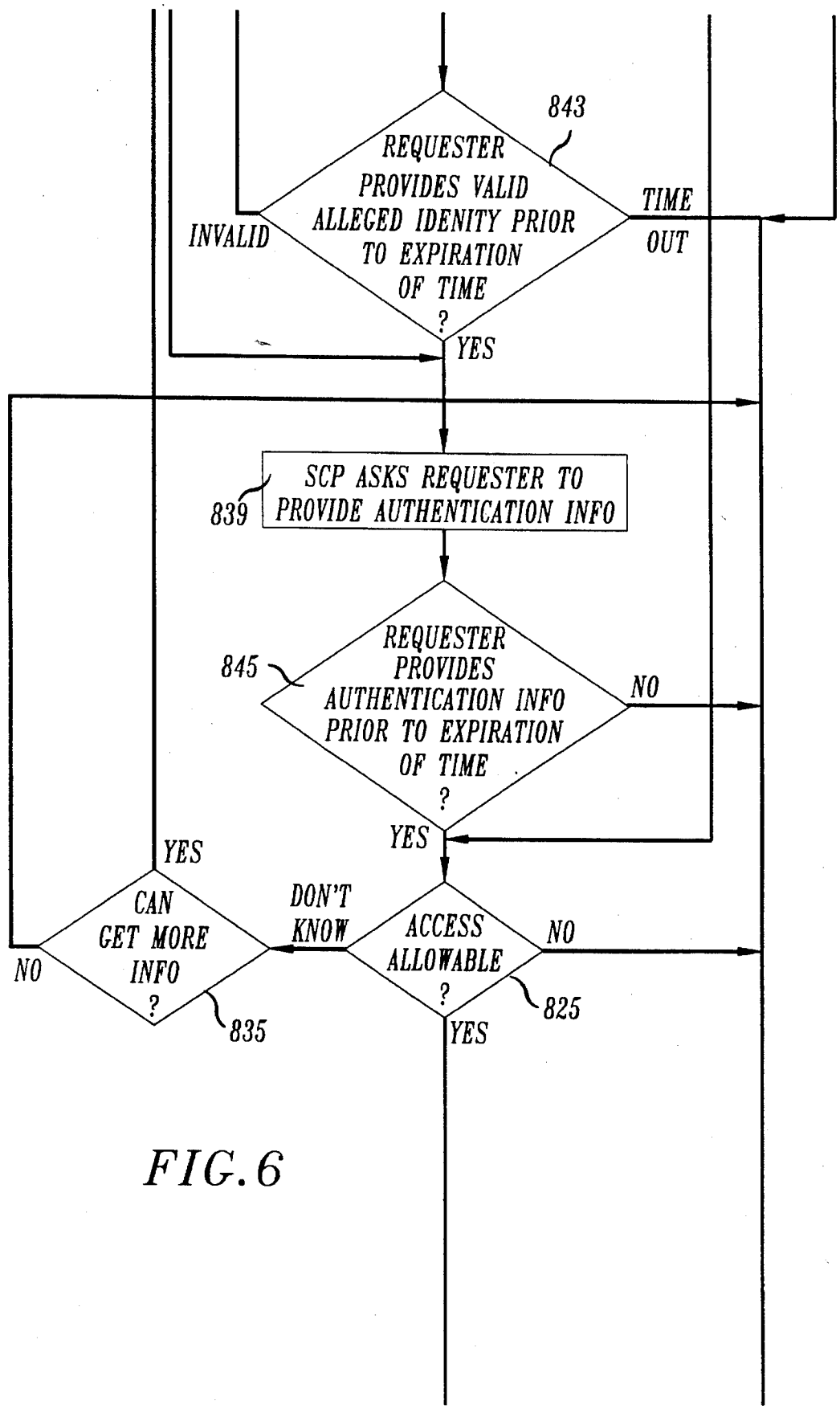

FIGS. 5, 6 and 7, when arranged as shown in FIG. 8, depict in flow chart form, an exemplary method of processing an access request by a requester to a destination where the security requirements for the granting of access is specified by the destination. The requester is located at originating station 102 (FIG. 1). The destination is the computer system of a bank, which, for purposes of this example is located at destination station 114. Destination station 114 is shown as a computer bridged onto a phone line. The bank has contracted to have its security clearance functions performed by the provider of long distance network 118 using security system 133.

Authorized user's of the bank computer system desire to employ the computer system of the bank to perform certain banking transactions. The bank has determined that it will only permit requesters to perform transactions valued at up to $200 if they are authenticated to at least a first level of authentication. Transactions of greater value need to be authenticated to a second, higher, level of authentication. This security information has been stored in destination profile storage 216 (FIG. 2). For the convenience of its authorized users, the bank has provided a toll free 800-type number which requesters can dial to gain access to the computer system. The necessary authentication information has been obtained from authorized users of the bank's computer system. This information has been stored in user profile storage 210 and user authentication data 312 (FIG. 3).

The method begins at step 801 when a requester at originating station 102 is detected to go off hook by switching machine 120. Thereafter, in step 803, the requester dials the number of the destination to which access is sought. In this example, the requester dials from originating station 102 the bank's 800 number, 1-800-BANK. In step 805, switching machine 120 receives the dialed digits and recognizes that the number dialed is an 800 type number for which service is provided via long distance network 118.

Switching machine 120 of LEC network 106, in step 807, routes the call to switching machine 128 in long distance network 118. Switching machines 128 routes the call to its appropriate associated NCP 132, as is typically performed for 800 type calls in step 809. The appropriate NCP 132 is determined from the function to be provided by the NCP to service the call and predetermined internal mapping tables contained within switching machine 128. Exemplary functions which are typically provided by NCP 132 are 800 and 900 number translation and conventional, well known credit card billing verification. Table 1 shows an exemplary NCP 132 translation table wherein the address of one of SCPs 134 may be returned in response to a call that requires security processing. NPA is an abbreviation for numbering plan area, more commonly known as area code.

TABLE 1

NCP Translation Table

| Called number | Originating NPA | Translate to |
| --- | --- | --- |
| 800-555-1234 | 908 | 908-949-3000 |
| 800-555-1234 | any other | 609-555-9876 |
| 800-BANK | any | SCP_134-1 |
| 800-BANKXYZ | any | SCP_134-1 |
| 900-INFOSVC | any | SCP_134-1 |
| 800-STOKMKT | 212, 516, 718 | SCP_134-1 |
| 900-555-0001 | any | 312-411-6543 |

In step 811, when the address of one of SCPs 134 of security system 133 is supplied in place of number translation or billing verification information, NCP 132 recognizes that this call may require security processing beyond a first level inherent in the nature of the request and accordingly routes the call to security system 133. In a preferred embodiment, as described above, each of SCPs 134 contains all the data necessary to perform all authentications. Therefore, NCP 132 routes the call to the closest one of SCPs 134. For purposes of this example, the closest one of SCPs 134 is SCP 134-1. Therefore, NCP 132 always returns the address of SCP 134-1, as shown in Table 1, when additional security processing beyond the first level may be required.

In an alternate embodiment, each user would have a predetermined "home" one of SCPs 134. This "home" one of SCPs 134 would be assigned based on a determined or inferred user identity. In a further alternate embodiment, each destination would have a predetermined "home" one of SCP 134s. The "home" one of SCPs 134 would be the one of SCPs 134 that is closest to the destination. Each NCP 132 would be associated with one of SCPs 134 and would initially route incoming calls that it receives to that one of SCPs 134. If the one of SCPs 134 to which the call was initially routed was not the "home" one SCPs 134 for the received call, that one of SCPs 134 would contain sufficient information to cause the call to be routed to the "home" one of SCPs 134 of that call for security processing.

SCP 134-1 receives the call information on requester signalling link 206. Upon receiving the call, SCP 134-1, in step 813 causes any first level of security processing specified by the nature of the request to be performed. For a call to be charged to a credit card, such a specification of a first level of security processing is that a valid credit card number, including the PIN portion, must be supplied by the requester. Other requests, such as direct distance dialed calls, 800-type and 900-type calls, have a null first level of security processing. This first level of security processing may be performed by SCP 134-1 itself or SCP 134-1 may request that the first level of security processing be performed by NCP 132 and the results of the processing be returned to SCP 134-1 via signalling network 138.

In accordance with an aspect of the invention, step 815 tests if the requester has successfully met the requirements of the first level of security processing. If the test result in step 815 is NO, control is passed to step 817 in which SCP 134-1 causes the connection to be refused. Thereafter, control is passed to optional step 819 which journals an unsuccessful access attempt. The method is then exited at step 821.

If the test result in step 815 is YES, control is passed to step 823 in which access decision unit 208 looks up the destination in destination profile storage 216 to determine what levels of authentication are required to achieve each level of access that can be made available for this type of request. If there is no profile for a particular destination then additional security processing is not required by that destination. Table 2 shows several exemplary destination profiles. The attributes which may be considered for each request in this example are the destination billing (bill) type, list of permitted users and a specified additional attribute. The authentication information which must be supplied to achieve each corresponding authentication level are shown in Table 3. It is noted that the mapping of the authentication level to the access level to be granted is specified by the destination profiles shown in Table 2.

the specified destination. ANI is the abbreviation for Automatic Number Identification which is the source of the request. In this example only the area code of the source is considered. Control is then passed to conditional branch point 825.

TABLE 3

| SCP Authentication Level Table | |
|---|---|
| Authentication Level | Authentication Means |
| 0 | None |
| 1 | PIN (or Password) |
| 2 | Voice Print |
| 3 | Finger Print |
| 4 | Retina Pattern |
| 5 | Keystroke Timing |
| N/A | No Access allowable |

In accordance with the principles of the invention, whether a particular access request will require the requester to actually supply authentication information is dependent upon the any first level of security processing inherent in the request, as well as the specified security needs of the destination and the values of the other attributes of the access request. These attributes typically include the alleged identity of the requester and the available call information. Available call information can include the originating address, e.g., automatic number identification (ANI), which

TABLE 2

| SCP Destination Table - Attributes and Access Requirements | | | | | |
|---|---|---|---|---|---|
| Destination | Bill Type | Permitted Users | Add'l Attribute | Authentic Level | Access Level |
| 1-800-BANK | — | group1 | — | 1 | till $200 |
|  | — |  |  | 2 | over $200 |
|  | — |  |  | 3 | over $200 |
| 1-800-BANKXYZ | — | group2 | — | 2 | till $5000 |
|  | — |  |  | 3 | over $5000 |
|  | — |  |  | 4 | over $5000 |
| 1-900-INFOSVC | — | not group3 | — | 0 | 1 min |
|  | — | group3 |  | 1 | 10 min. |
|  | — | group3 |  | 2 | 1 hour |
| 1-800-STOKMKT | — | any | ANI=212 | 0 | 10 min. |
|  | — | any | time=1000 –1600 local | 1 | unlimited |
| Internatn'l Calls to country group 2 | CC | any | PFO | N/A | none |
|  | CC | any | NPO | 3 | 20 minutes |
| Internatn'l Calls to country group 1 | CC | any | PFO | 2 | 10 minutes |
|  | CC | any | PFO | 5 | 30 minutes |
|  | CC | any | NPO | 2 | unlimited |
| Domestic Calls | CC | any | PFO from S. Bronx | 2 | unlimited |

The "groupX" entries in the Permitted Users column, where X is a number, are pointers to lists of users who are authorized to gain access to the destination. Such lists would be stored in destination profile storage 216. For example, group 1 would be a pointer to a list of all the identities of the users who were authorized by the bank to access the bank's computer system. As mentioned above, this information was previously supplied by the bank to the provider of long distance network 118. Similarly, the "country group X" entries in the destination column are pointers to lists of countries which receive the same security treatment. CC stands for Credit-card Call. PFO stands for Public Phone Origination. NPO stands for Non-public Phone Origination. A dash indicates the particular attribute is not considered for would specify the location from which the access is sought; the destination to which access is sought which can be determined from the number dialed; the cost of the call, which may be expressed as a cost per unit of access or a cost reflecting the overall value of the access, and any other parameters of the call.

In conditional branch point 825, access decision unit 208 of SCP 134-1 tests to determine, in accordance with the principles of the invention, if it can definitely allow access to be granted at the level requested, if it can definitely not allow access to be granted at the requested level or if it doesn't know whether it should allow access to be granted. For purposes of this example, each destination profile stored in destination profile storage 216 specifies the available levels of access and the corresponding set of attributes required to achieve authentication such that access to the destination can be granted at each available level. Again, such profiles are shown in Table 2. In accordance with an aspect of the invention, upon the initial iteration of step 825 access will be caused to be granted to a requester since any first level of security processing inherent in the request has been met by the requester, unless a predetermined set of attributes of the particular access request matches a set of specified criteria for those predetermined attributes, in which case additional authentication information is requested from the requester. If the requested additional authentication information is supplied, that information is used as pan of the available request attributes, along with the other request attributes, in an attempt to authenticate the alleged identity of the requester. If the requester is authenticated, access is granted. The attributes of a request that can be specified are any information concerning the access request that can be made available to security system 133.

In accordance with the principles of the invention, if the test result in step 825 is YES, the predetermined set of attributes does not match the specified criteria for those attributes and therefore access should be granted at the requested level—if any first level of security inherent in the request is met, which is assumed herein—control is passed to step 827. In step 827 access decision unit 208 of SCP 134-1 obtains the destination authentication information. Destination authentication information is authentication information supplied by security system 133 to a destination so that the destination knows that it is communicating with security system 133. This information is stored in destination authentication store 408 (FIG. 4) and is retrieved therefrom via destination authentication processor 402 over link 404 and supplied via link 222 to access decision unit 208. This information is stored in destination profile storage 216 and is supplied to access decision unit 208 over link 222. Table 4 shows the information that SCP 134-1 will supply to each destination to authenticate itself.

TABLE 4

SCP Destination Protocol Table

| Destination | SCP Login | SCP Authentication | Add'l Authentication |
|---|---|---|---|
| 800-BANK | SCP | password=its-me | — |
| 800-BANKXYZ | SCPXYZ | password=qazxswedcvfr | — |
| 900-INFOSVC | ATT | Challenge/response protocol | key=314159 |
| 800-STOKMKT | — | — | — |

In step 829, SCP 134-1 establishes a connection to destination station 114, in this example, the computer system of the bank. This connection is established by destination authentication unit 220 and connects destination information path 230 to destination station 114 through switching machine 128, switching machine 130, LEC network 110, switching machine 124 and their respective interconnecting links. SCP 134-1 engages in an authentication session with destination station 114 in step 831. During this authentication session, which will be discussed further below, SCP 134-1 can either identify itself as SCP 134-1 and indicate that it is vouching that the requester is a user who has been authorized to a specific level or SCP 134-1 can mimic the requester's login sequence.

SCP 134-1, in step 833 causes the requester at originating station 102 to be granted access to destination station 114 SCP 134-1 communicates to destination station 114 the level of access which is to be granted to the requester via destination challenge/response 406. SCP 134-1 then causes originating station 102 to be interconnected to destination station 114. This interconnection is accomplished, by SCP 134-1 transmitting to switching machine 128 the appropriate commands to directly interconnect switching machine 120 of LEC network 106 to switching machine 130 as that connection would have been established had the functions of SCP 134-1 not been invoked. SCP 134-1 also disconnects itself from the call. Thereafter, the method is exited at step 821.

The test result during the initial pass through step 825 is DON'T KNOW in accordance with an aspect of the invention, if the predetermined set of attributes matches the specified criteria for those attributes. For the call to the bank, DON'T KNOW is the result for the initial iteration of step 825, because it is assumed that each requester wishes to be able to perform transactions in excess of $200. The DON'T KNOW result indicates that access should not be granted immediately at the requested level and, instead, additional authentication information, beyond that required for any security processing inherent in the request, should be requested, in accordance with the principles of the invention. Therefore, control is passed to conditional branch point 835.

Conditional branch point 835 tests to determine if there remains authentication information that can be obtained from the access requester, as specified in his profile, or alternatively, if additional authentication features can be extracted from the information which the requester has already supplied. If the test result in step 835 is YES, in accordance with an aspect of the invention, control is passed to step 837 to obtain the next piece of additional authentication information specified in the profile. Exemplary user profiles are shown in Table 5. If the identity of the requester is unknown during an iteration of step 835, the test result will be YES. This is because at least an alleged identity can be requested.

TABLE 5

SCP Originator (User) Table

| Full Name | Identity | Authentic Level | Destination | Access Level |
|---|---|---|---|---|
| John_Watanabe | watan | 2 | 1-900-WEATHER | 10 min./day |
| | | 5 | 1-900-WEATHER | 1 hr./day |
| | | 3 | any other 900 | unlimited |
| | | 3 | 1-800-BANKXYZ | till $5000 |
| Joe_Williams | willj | 2 | 1-900-SPORTS | unlimited |

TABLE 5-continued

SCP Originator (User) Table

| Full Name | Identity | Authentic Level | Destination | Access Level |
|---|---|---|---|---|
| | | 4 | 1-900-SPORTS | unlimited |
| | | 3 | 1-900-INFOSVC | 30 min./call |
| Sarah_Williams | wills | 2 | 1-900-SPORTS | unlimited |
| | | N/A | 1-900-INFOSVC | none |
| Tom_Williams | willt | N/A | 1-900-SPORTS | none |
| | | N/A | 1-900-INFOSVC | none |
| Hank_Williams | willh | N/A | 1-900-SPORTS | none |
| | | N/A | 1-900-INFOSVC | none |
| Byron_McDoe | bemc | 0 | any | unlimited |

In step 837, SCP 134-1, as directed by access decision unit 208, tests to determine if an identity alleged by the requester is already available. An identity may be available if it was specified as part of the first level of security processing, if it was already specifically requested as a pan of additional security processing or it may be inferred from the characteristics of the request. Such an inference may be drawn if a call is placed from a phone having only one authorized user, e.g, a home phone or a locked phone. If the requester's identity is already available in step 837 the test result is YES and control is passed to step 839 and the identity available in step 837 will be used as the identity that was alleged by the requester. If an alleged identity is not available in step 837 the test result is NO and control is passed to step 841.

For purposes of this example, requesting and receiving an alleged identity is not part of the first level of security processing inherent in the request. This is because it is well known that the nature of conventional 800-type calls by themselves, as requests for bandwidth connections to remote locations, do not to require any security processing for their completion, i.e., 800-type calls do not require that an identity of the caller be alleged or that any form of authentication information be supplied by the caller. Therefore, in accordance with an aspect of the invention, the requesting of the identity, including a self-authenticating check sequence which is the user's PIN, is part of the additional security processing required for this particular 800-type call request. This additional processing is invoked based on the destination attribute of the request and the need to satisfy the permitted users attribute of the request before any access can be granted. In accordance with an aspect of the invention, if the requester supplies an identity code including the PIN portion that corresponds to an authorized user, he will be successfully authenticated to authentication level 1 (Table 3). Therefore, the requester will be able to at least perform transactions valued up to a total of $200, as can be seen from Table 2.

In step 841, SCP 134-1 requests that the requester allege his identity. For purposes of this example, the request by SCP 134-1 for authentication information is in the form of computer synthesized speech telling the user to supply the identity that he wishes to allege. This request is generated by requester challenge 308 in response to instructions from requester authentication processor 302 received via link 304. Requester authentication processor 302 is itself responsive to commands received from access decision unit 208 via link 222. The generated request is supplied to requester information path 204 and transported back to the user via information bearing facilities of switching machine 128, LEC network 106, originating station 102 and interconnecting links therebetween.

Conditional branch point 843 tests to determine if the user has provided the alleged identity information requested within a predetermined period of time and, if an alleged identity has been supplied, whether it is valid, i.e., whether it is the identity of an authorized user. This step may be accomplished as part of a first level of security processing specified by the nature of the request or it may be separately performed. An identity can be alleged by supplying the digits of an identity code in the form of multi-frequency tones from the telephone keypad. This identity code is unique to each authorized user.

The code is received by comparison function 310, which is a general purpose unit for receiving data supplied from requester information path 204 and comparing it with prestored information. This prestored information may be stored in user authentication data 312 or it may be supplied by requester authentication processor 302. Comparison function 310 is responsive to requester authentication processor 302 and supplies thereto a probability that the received information was supplied by the same person who supplied the information stored in user authentication data 312. Comparison function 310 may actually be comprised of a number of constituent functions, each of which is invoked to with a particular type of data to be compared. Alternatively, comparison function 310 may be implemented by a general purpose processor.

If the test result in step 843 is TIME-OUT, indicating that the user has failed to supply at least the required number of digits for an identity code, control is passed to step 817 in which SCP 134-1 causes the connection to be refused. If access decision unit 208 determines that the time period has expired, it sends a message via requester authentication unit 218 and requester information path 204 to the requester. This message may be a voice message informing the requester that the time out period has been exceeded and that he is being disconnected. Access decision unit 208 sends a message to switching machine 128 via requester signalling link 206 instructing switching machine 128 to terminate the requester's call. Thereafter, control is passed to optional step 819 which journals an unsuccessful access attempt. The method is then exited at step 821.

If a complete code is received within the allotted time period, the alleged identity is checked for validity, i.e, if it corresponds to a permitted user as defined by the permitted user attribute. Access decision unit 208 looks up the code in the appropriate list of permitted users, if specified, or in user profile storage 210, if a list is not specified. If the test result in step 843 is INVALID, i.e., an invalid code was supplied, which may be determined from the absence of an appropriate entry for that code, control is passed back to step 841 to allow the requester additional attempts to supply a valid identity code. At the implementor's discretion, the number of failed attempts may be limited to a predetermined number. When the predetermined number is exceeded, control is passed to step 817, as if a TIME-OUT occured. This predetermined number may be one (1). If the test result in step 843 is YES, a valid code was supplied and control is passed back to conditional branch point 825.

In step 839, SCP 134-1, as directed by access decision unit 208, requests that the requester provide information to authenticate the requester's alleged identity to the level corresponding to the level of access desired. It is presumed that initially the highest level of access available is desired. Of course, the requester could initially be prompted to specify the level of access desired within the scope of the invention. Alternatively, if the requester is not successfully authenticated to the level desired but he has been successfully authenticated to some level of access, the requester may be offered the opportunity to accept that level of access as the requested level. For purposes of this example, the request by SCP 134-1 for authentication information is in the form of computer synthesized speech. In a similar manner to the request for an alleged identity, the request is generated by requester challenge 308 in response to instructions from requester authentication processor 302 received via link 304. Again, requester authentication processor 302 is itself responsive to commands received from access decision unit 208 via link 222. The generated request is supplied to requester information path 204 and transported back to the user via information bearing facilities of switching machine 128, LEC network 106, originating station 102 and interconnecting links therebetween. In other implementations, the request could be any type of message that may be understood directly or indirectly by either the requester or equipment at the request's location.

For purposes of this example, the request is for a voice sample from the requester. The destination profile shown in Table 2 for destination 1-800-BANK shows that to achieve access at a level over $200 authentication to level 2 is needed. Table 3 shows that authentication level 2 requires a voice print (sample). More particularly, the voice sample requested could be for a predetermined utterance or the request itself could specify what the utterance is to be. The voice sample is received and processed by voice password 306, which compares a representation of the received sample with a corresponding representation supplied by the authorized user that is alleged. This corresponding sample is stored in user authentication data 312. Requester authentication processor 302 develops a probability that the new sample was provided by the same individual who had supplied the stored sample. This probability is supplied to requestor authentication processor 302. Voice password 306 is thus essentially a specialized version of comparison function 310. Any type of authenticating information that may be understood by either the requester or equipment at the request's location can be employed.

Conditional branch point 845 tests to determine if the user has provided the authenticating information requested within a predetermined period of time. If the test result in step 845 is NO, control is passed to step 817 in which SCP 134-1 causes the connection to be refused as discussed above. Thereafter, control is passed to optional step 819 which journals an unsuccessful access attempt. The method is then exited at step 821. If the test result in step 845 is YES, control is passed back to conditional branch point 825.

For each type of authentication information there may be a "try again" threshold which when reached, during an iteration of step 825, indicates that the received authentication information yields an authentication that is close to the desired level but the authentication remains as yet uncertain. The values of the "try again" threshold may be dependent on the particular set of attributes for any given request. If the "try again" threshold is reached, access should not be granted to the desired level but the requester may be allowed to supply a different form of authentication information to obtain access in accordance with an aspect of the invention. Therefore, in accordance with an aspect of the invention, if the test result in subsequent iterations of step 825 is that access decision unit 208 of SCP 134-1 remains unsure as to whether access should be allowed at the level requested, the test result in step 825 is DON'T KNOW and control is passed to conditional branch point 835. Table 6 shows several types of authentication information and the requirements to achieve access, to be denied access or to be allowed to "try again" for each type for use in step 825. $X1$, $X2$, $Y1$, $Y2$, $Z1$, $Z2$ are system dependent implementor chosen parameters that determine the accuracy and tolerances of the particular recognition and comparison system employed. Determination of such parameters will be obvious to one skilled in the art. As seen in Table 6 the following relationships among the parameters are required: $X1 > X2$, $Y1 < Y2$, $Z1 < Z2$. DTW stands for Dynamic Time Warp, which is well known in the art.

TABLE 6

| | SCP Authentication Decision Table | | |
|---|---|---|---|
| Authentication Info Type | Access Denied | Try Again | Access Granted |
| PIN or Password | No Match | 80% Match | All Match |
| Voice Print | $DTW > X1$ | $X2 < DTW < X1$ | $DTW < X2$ |
| Finger Print | # Features Matching $< Y1$ | $Y1 <$ # Features Matching $< Y2$ | # Features Matching $< Y2$ |
| Retina Pattern | #Features Matching $< Z1$ | $Z1 <$ # Features Matching $< Z2$ | # Features Matching $< Z2$ |

In conditional branch point 825, access decision unit 208 of SCP 134-1 again tests to determine if it can definitely allow access to be granted at the level requested, if it can definitely not allow access to be granted at the requested level or if it doesn't know whether it should allow access to be granted. This determination is now based on the available call information specified by the destination profile as well as the probability developed by either voice password 306 or comparison function 310 for the most recently received requester authentication information. If a voice password was requested, the "try again" threshold might be reached if a requester supplying a voice password is actually an authorized user suffering from nasal congestion. Such a user would be unlikely to gain access even if permitted to repeat the same voice password. Also, an imitator might improve his imitation if given another chance. An advantage of this system is that the user suffering from nasal congestion would be permitted to provide other identifying information thereby authenticating himself. Also, the imitator would be less likely to be able to simulate and supply all the types of information which may be requested for authentication. Other methods of determining whether access should be allowed may be employed.

In this example, each authentication is evaluated independently even if insufficient. Even if an authentication is insufficient to grant access, it must at least reach the "try again" threshold to continue the process. Other embodiments will be readily apparent without departing from the scope and spirit of the invention. This iterative requesting of additional authentication information may be performed, in accordance with an aspect of the invention, without the knowledge of the requester. This may be achieved by scanning the user without informing him or by more intensely processing the already obtained data so as to glean more insight as to the authenticity of the requester. One method of scanning the user without informing him is to activate a video camera at his location and scan an image of the requester. Additional insight as to the authenticity of the requester may be gleaned without obtaining further data from the user by, for example, by processing already obtained voice samples with additional analyzation routines which require an additional period of time to run but yield greater accuracy or by examining the timing relationship between the keystrokes which the user employed to enter his alleged identity.

If the test result in step 825 is NO and access is definitely not allowable at the requested level, control is passed to step 817, in which SCP 134-1 causes the connection to be refused. Thereafter, control is passed to optional step 819, which journals an unsuccessful access attempt. Then, the method is exited at step 821. In an alternative embodiment, if the requester has been successfully authenticated to a lower level of access, that level of access may be granted. For example, if the requester of access to the bank's computer successfully supplied an identity code including the PIN portion that corresponds to an authorized user, he will be successfully authenticated to authentication level 1. The requester could then be granted access to perform transactions up to $200.

Security system 133 must be implemented securely since if its security is breached it can compromise the entire network. However, no other destination need be secured. If security system 133 vouches for the requester, it may optionally communicate to the destination information that is specific to the requester, such as the confirmed identity of the requester. If security system 133 mimics user login information each destination for which the user is authorized will be supplied with appropriate, but different, login information. Therefore, the compromise of the information for one destination will not compromise any other destination. However, the requester must supply to security system 133 only a single set of login information no matter which destination he seeks to access. SCP 134-1 of security system 133 will automatically translate the requester supplied login information to the destination required login information based on its knowledge of the selected destination.

If a higher level of security is required at a later point in the session, SCP 134-1 could be reinvoked. Such reinvoking could be implemented by having a multi-frequency tone receiver on switching machine 128 monitoring a session between originating station 102 and destination station 114 such that a predetermined tone sequence would alert switching machine 128 to the originator's need for additional security processing by SCP 134-1. Information and signalling paths could then be established from the originator and destination to SCP 134-1 by alerted switching machine 128.

The manner in which a wave is polarized as it passes through a portion of the requester's body or a handwriting sample may also be used as authenticating information. Of course, compatible apparatus must be available at the requester's location to obtain each type of authentication information from the requester and to transmit a representation thereof to SCP 134-1. Apparatus capable of obtaining such information is well known. Such authentication information would be processed by comparison function 310.

Figure 9:
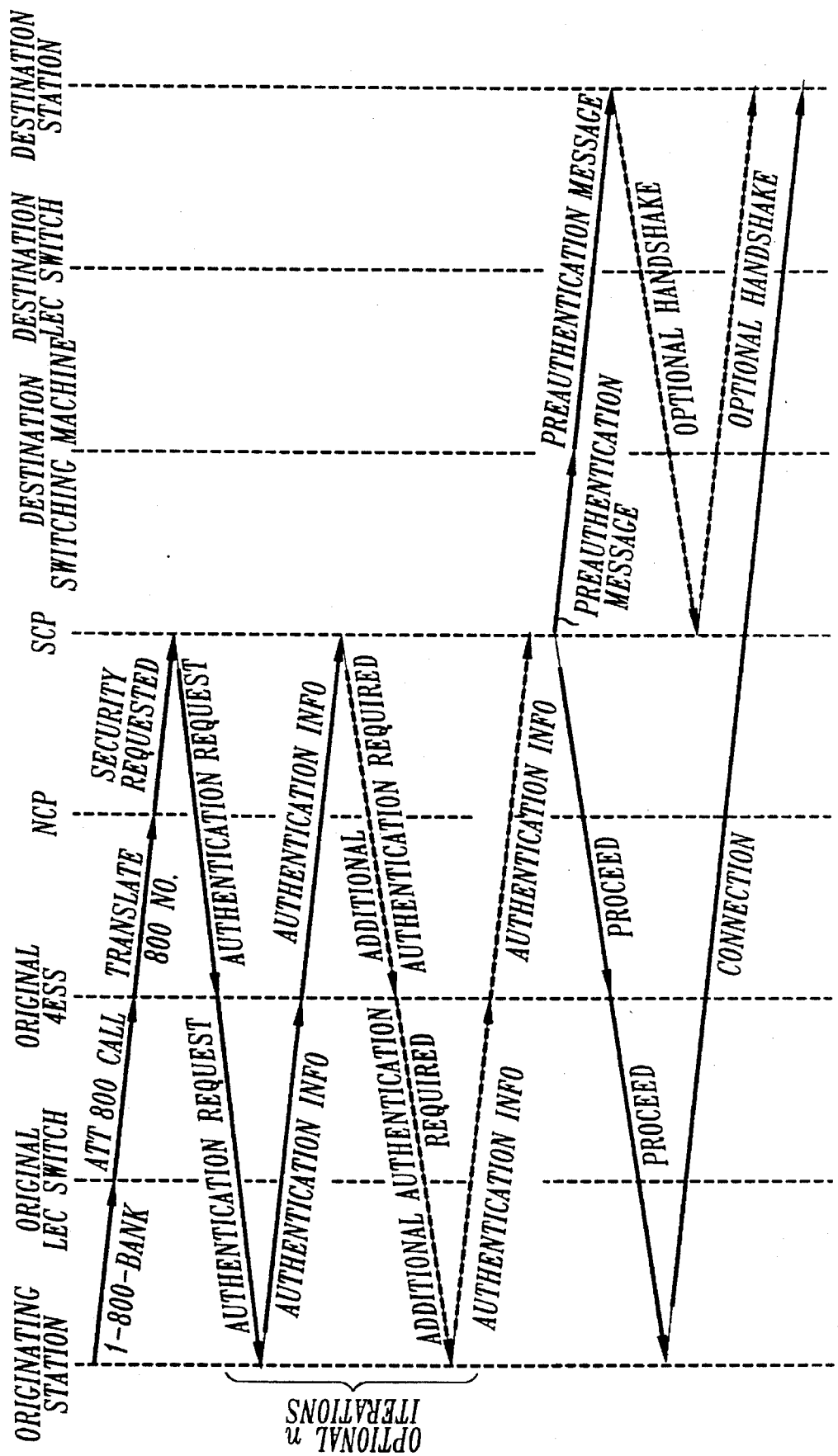
FIG. 9 shows an example of the call setup messages employed if a security system is to provide secured access by a user to a particular destination.

Shown in FIG. 9 is an example of the call setup messages employed when security system 133 is to provide secured access by a user to a particular destination as described above. The call setup messages may be both signalling type messages carried by signalling network 138 and information type messages carried by information links 140. Such messages are well known to one skilled in the art. A request at an originating station, e.g., originating stations 102 (FIG. 1) goes off hook and dials the desired destination, e.g., 1-800-BANK. The originating LEC switching machine to which the user is connected, e.g., LEC switching machine 120, determines that the call is an 800 type call handled by the long distance network 118. The handling of conventional unsecured 800 type calls is well known to one skilled in the art. A message is sent from LEC switching machine 120 to an originating switching machine in long distance network 118, e.g. switching machine 128 indicating that there is an incoming 800 type call and the number that has been dialed.

The originating switching machine forwards the 800 number received to NCP 132 for translation to an actual destination address, i.e., a destination phone number in the conventional manner. In accordance with an aspect of the invention, NCP 132 forwards a security requirement message to SCP 134-1 because the address of SCP 134-1 was stored in the NCP table, instead of an actual translation of the destination. After it receives the security request message, SCP 134-1 knows the source of the request, the destination to which access is desired and other parameters obtained SCP 134-1 then determines, by employing its stored profiles what, if any, additional security processing is appropriate for this communication.

If additional security processing is required, SCP 134-1 first sends an authentication request message which is forwarded through NCP 132, originating switching machine 128, originating LEC switching machine 120 to originating station 102. If an alleged identity can not be inferred, the authentication message requests that the user provide identification allegation information thereby alleging who the requester is. The requester then provides the requested authentication information within a predetermined amount of time or the request is terminated as discussed above. If the requester provided the authentication information that was requested, the information is forwarded via originating station 102, originating LEC switching machine 120, originating switching machine 128 and NCP 132 to SCP 134-1.

In accordance with an aspect of the invention, SCP 134-1, upon receiving the authentication information, analyzes all the currently information available to it concerning the access request to determine to which, if any, level of authentication the user has presently successfully authenticated himself. If the requester has not authenticated himself sufficiently to achieve the desired level of access, SCP 134-1 can send additional authentication request messages, which are forwarded through NCP 132, originating switching machine 128, originating LEC switching machine 120 to originating station 102. These additional authentication messages request that the user provide authentication information that can be used to authenticate the alleged identity of the requester. The requester then provides the requested authentication information within a predetermined amount of time or the request is terminated. If the requester provided the authentication information that was requested, the information is forwarded via originating station 102, originating LEC switching machine 120, originating switching machine 128 and NCP 132 to SCP 134-1. SCP 134-1, upon receiving the authentication information, again analyzes the information available to it concerning the access request and determines to which, if any level of authentication the user has successfully authenticated himself. If the user has authenticated himself to a level sufficient for access at the level requested to be granted, such access is granted. This process may be repeated n times, where n is a predetermined number selected by the implementor. An exemplary value of n is 2.

Upon successful authentication, SCP 134-1 transmits to originating station 102 a proceed message, which is forwarded through NCP 132, originating switching machine 128, originating LEC switching machine 120. Also, a pre-authentication message specifying the level of access granted is forwarded to the destination station via destination switching machine and destination LEC switch. Optional handshaking messages may then be exchanged between destination station 114 and SCP 134-1. A complete connection is the then established directly from the user to the destination thereby giving the user access to the destination at whatever level was previously authorized. SCP 134-1 and NCP 132 are free to process other calls.

Figure 11:
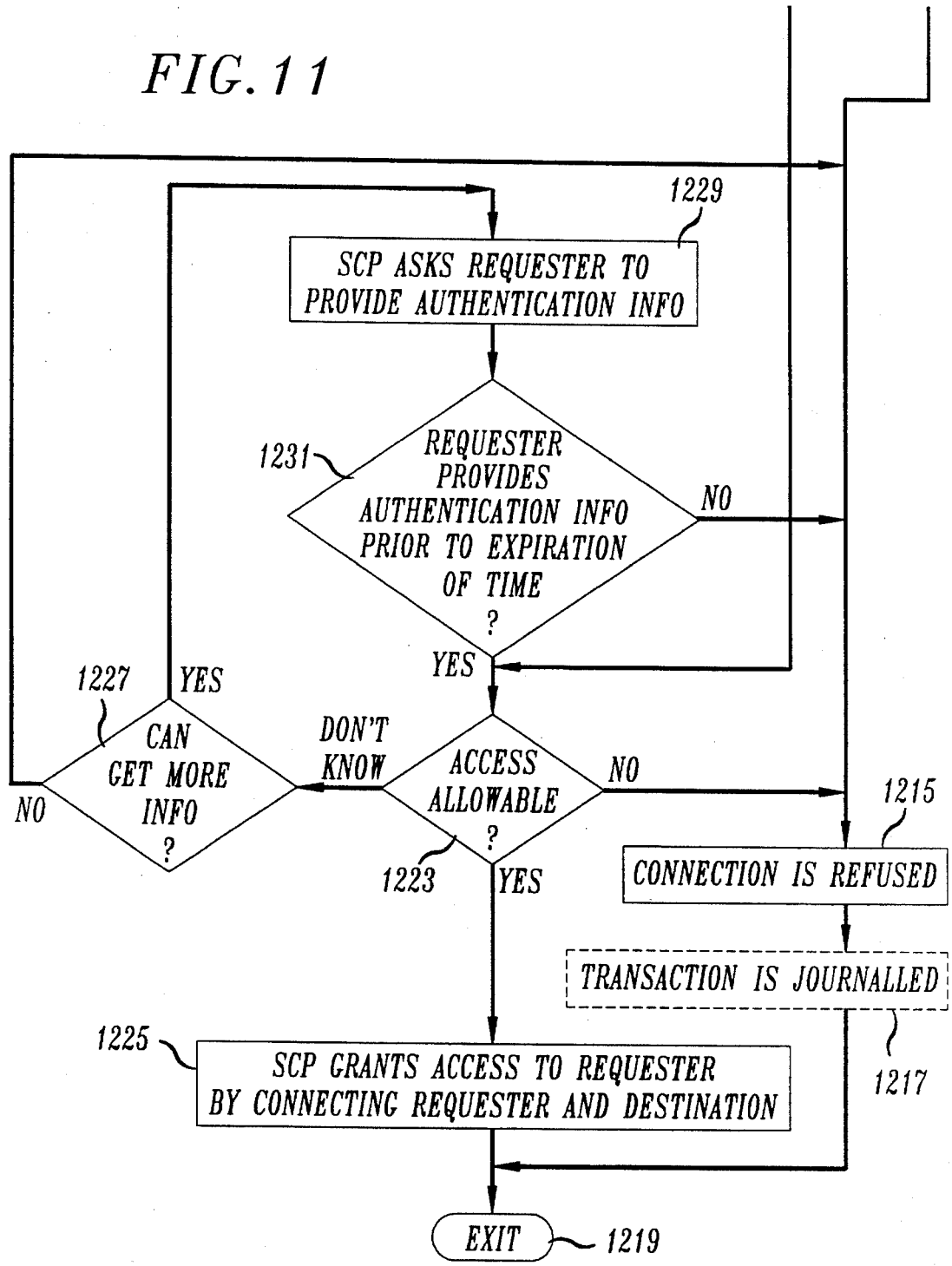

FIGS. 10 and 11, when arranged as shown in FIG. 12, depict in flow chart form, an exemplary access request by a requester to a destination where the additional security requirements for the granting of access, beyond those inherent in the nature of the request, is specified by the requester or the network operators. Again, the requester is located at originating station 102 (FIG. 1). The destination is a sports hot line service, which, for purposes of this example, is located at destination station 116. For the convenience of the public, a pay per use premium billing 900-type access number (1-900-SPORTS) is provided under contract with the network operators by the purveyor of the hot line service.

A man, Joe Williams, desires to allow access to all 900-type services to the hot line service for himself and his wife but not to his two sons who have previously demonstrated an affinity for accumulating large bills for the sports hot line service. The man has therefore arranged that security procedures be employed whenever a 900-type call is to be billed to his account and he has supplied to the network operators identifying information that is to be used for authenticating the identities of himself and his wife. Other users of his account, e.g. guests at his home using his home phone or the two sons, will be allowed access to destinations other than the sports hot line. The two sons are also authorized to use the family phone credit card to charge calls thereto, but again, not for use in accessing the sports hot line. Furthermore, only Joe can access a premium information service (1-900-INFOSVC). This information has been entered into SCP 134-1. Also, an indication that security services are to be invoked for 900-type calls made from his line has been programmed into switching machine 128 in the same manner as is employed for the well known call block feature. Such programming is well known by one skilled in the art.

Accordingly, the method is entered at step 1201 when a requester at originating station 102 located in the Joe's home is detected going off hook by switching machine 120. Thereafter, in step 1203, the requester dials the number of the destination to which access is sought. In this example, the requester dials 1-900-SPORTS at originating station 102. In step 1205, switching machine 120 receives the dialed digits and recognizes that the number dialed is an 900-type number for which service is provided via long distance network 118. Such recognition may be performed by table lookup and is well known in the art. Switching machine 120, in step 1207 routes the call to switching machine 128 in long distance network 118. Switching machines 128 recognizes that 900-type calls from this line are to be routed to security system 133 instead of NCP 132, in step 1209. For purposes of this example, the closest one of SCPs 134 is SCP 134-1. SCP 134-1 receives the call information on requester signalling link 206.

Upon receiving the call, SCP 134-1, in step 1211, causes any first level of security processing specified by the nature of the request to be performed. A call to the sports hot line that is directly billed has a null first level of security processing. Contradistinctively, a call to the sports hot line that is to be charged to a credit card requires the first level of security processing inherent in a credit cared call, that is the requirement that a valid credit card number, including the PIN portion, be supplied by the requester. Such a call would initially be routed to NCP 132, in the typical manner of a conventional unsecured credit card call. However, instead of the well known unsecured credit card verification processor being returned by NCP 132 as the node to handle the call, NCP 132 would specify to route the call to security system 133, and more particularly in this example, to SCP 134-1.

In accordance with an aspect of the invention, conditional branch point 1213 tests to determine if the requester has successfully met the requirements of the first level of security processing. If the test result in step 1213 is NO, control is passed to step 1215 in which SCP 134-1 causes the connection to be refused. Thereafter, control is passed to optional step 1217 which journals an unsuccessful access attempt. The method is then exited at step 1219.

If the test result in step 1213 is YES, control is passed to step 1221 in which SCP 134-1 looks up the user profile for the alleged identity and determines the predetermined levels of authentication, if any, are required to achieve the various levels of access available for this type of call. The determination of the predetermined levels is made by access decision unit 208 which employs information supplied from user profile storage 210 (see Table 5) over link 222. For clarity and brevity it is assumed that for this application of the invention there will always be an available alleged identity. This alleged identity is derived either from the line from which the request was placed or from a credit card number supplied to meet a first level of security processing, if the call is billed to a credit card. In an alternative embodiment, if an alleged identity can not be derived, one may be requested as described above in connection with FIG. 8. Table 5 shows a unique identity code for each user that could be employed in such an embodiment. In accordance with an aspect of the invention, if no entry or a null entry is found in user profile storage 210 for an alleged identity, additional security processing beyond the first level is never required for that identity.

One exemplary way of organizing the security information when multiple users are authorized to use a single alleged identity, as in the case of the family, is to arrange for separate profiles for each user that are grouped together. Each such profile would include all the attributes for identifying the individual and the conditions under which various types of access would be granted. The identification information supplied is then employed to discriminate among the available profiles to determine which of the authorized users is actually calling. Upon successful authentication of one of the authorized users, access is then granted or denied in accordance with that user's authorization. Such a situation arises when the Williams credit card number is the alleged identity.

In accordance with the principles of the invention, access decision unit 208 of SCP 134-1 tests to determine, in conditional branch point 1223, if access at the level requested is clearly allowable, clearly not allowable or if it is still not sure. This access decision is based on the requirements specified in the stored user profile (Table 5), the alleged identity and the available call information as described above for step 825 (FIG. 8). In accordance with the principles of the invention, if the call was an ordinary long distance call or an 800-type of call which did not meet any of the user specified set of attributes required to invoke additional security processing beyond the inherent null first level required for such requests, or neither the user nor the network specified that there ever be any requirement of additional security processing the test result in step 1223 is YES and control is passed to step 1225. The address of a next switching machine to route the call to would be returned and no security processing would be invoked. SCP 134-1 will convey to the destination the level of access that has been granted to the requester, as described above. If the access level is a time limit, the destination for purposes of timing and enforcing of the access level is switching machine 128. This is accomplished by employing the same timing mechanisms employed for billing purposes. The method is then exited via step 1219.

In accordance with an aspect of the invention, if the test result in step 1223 is DON'T KNOW, indicating that access decision unit 208 of SCP 134-1 remains unsure as to whether access should be allowed, control is passed to step 1227. The test result during an initial iteration of step 1223 will be DON'T KNOW if authentication information is required before access can be granted. During subsequent iterations of step 1223 the test result will be DON'T KNOW if authentication information was previously obtained and a "try again" threshold was reached. Conditional branch point 1227 tests to determine if there remains additional authentication information that can be obtained from the access requester or, alternatively, if additional authentication features can be extracted from the information which the requester has already supplied.

For example, if the oldest son, Tom Williams, was attempting to reach the sports hot line, during the initial iteration of step 1227 he may sound like his father Joe with nasal congestion. He may therefore be able to reach the "try again" threshold for the requested voice print. If Joe was actually calling but he had nasal congestion he might only be able to meet the "try again" threshold. However, it would be undesirable to deny him access since he is an authorized user. Therefore, additional authentication information, in this case a retina pattern, is also stored for Joe in security system 133. If during a request for access to the sports hot line the requester reaches the "try again" threshold for the voice print, the retina pattern of the requester can be requested and obtained for authentication purposes during a subsequent iteration of step 1227. If the obtained retina pattern matches the stored retina pattern, access can be granted and the test result in step 1223 will be YES on the next iteration of that step.

If the test result in step 1227 is YES, in accordance with the principles of the invention, control is passed to step 1229 to request additional authentication information from the requester. In accordance with an aspect of the invention, this iterative requesting of additional authentication information may be performed without the knowledge of the requester, as described above.

In step 1229, SCP 134-1, as described above, requests that the requester provide authentication information to confirm the requester's alleged identity. For purposes of this example the request is for a voice print from the requester. As described above, other authenticating information may be requested.

Conditional branch point 1231 tests to determine if the user has provided the authenticating information requested within a predetermined period of time. If the test result in step 1231 is NO, control is passed to step 1215 in which SCP 134-1 causes the connection to be refused. Thereafter, control is passed to optional step 1217 which journals an unsuccessful access attempt. The method is then exited at step 1219.

If the test result in step 1231 is YES, control is passed to conditional branch point 1223 in which access decision unit 208 of SCP 134-1, tests to determine in the same manner as described above if access to the destination is clearly allowable, clearly not allowable or if it is still not sure. If the test result in step 1223 is NO, and access is not allowable because the supplied authentication information did not sufficiently match the store authentication information, according to Table 6, control is passed to step 1215, in which SCP 134-1 causes the connection to be refused. Thereafter, control is passed to optional step 1217, which journals an unsuccessful access attempt. The method is then exited at step 1219.

If the test result in step 1223 is YES, because authentication to the level required has been achieved in accordance with Table 6, access should be granted and control is passed to step 1225 wherein SCP 134-1 grants the requester at originating station 102 access to the destination station 114 as described above. Thereafter, the method is exited at step I137.

We claim:

1. A method for use in obtaining access to a credit account for use in the billing of telephone calls placed through a telephone network that controls the establishing of connections among a plurality of telephone stations, said method comprising the steps of:

receiving from a requester a request for access to a particular credit account for charging thereto charges arising from a proposed connection from a first of said plurality of telephone stations to a second of said plurality of telephone stations, said request for access specifying said first and second of said plurality of telephone stations and requiring at least a first level of security processing that collects authentication information and authenticates said requester at least to said first level based only on said collected authentication information before access to said particular credit account may be granted;

making a determination, as a joint function of at least (i) the location of said first telephone station (ii) the location of said second telephone station and (iii) said requester having been authenticated to said first level, that additional security processing beyond said first level is required before access to said particular credit account can be granted; and prompting said requester, only when said additional security processing is required, to provide additional authentication information beyond that collected from said requester in the satisfying of said first level of security processing.

2. The method as defined in claim 1 further including the step of receiving said additional authentication information by said system as an input for use in further authentication of said requester if said additional authentication information is supplied by said requester.

3. The method as defined in claim 2 further including the step of making a comparison between said received additional authentication information and previously stored authentication information corresponding to an identity alleged by said requester as part of said first level of security processing, the result of said comparison for use in determining a level of access to be granted to said requester.

4. The method as defined in claim 3 further including the step of reiterating said steps of prompting, receiving additional authentication information and making a comparison for further authentication information beyond that already received from said requester only if a predetermined authentication threshold was reached in said step of making a comparison during at least one preceding iteration of said steps of prompting, receiving additional authentication information and making a comparison, said authentication threshold being insufficient to achieve a level of access desired by said requester.

5. The method as defined in claim 4 wherein said further authentication information is of a type not previously prompted for in said step of prompting.

6. The method as defined in claim 3 wherein said alleged identity is associated with multiple authorized users, each of said multiple authorized users having his own previously stored authentication information and further including the step of determining from said received additional authentication information which of said multiple authorized users said requester is.

7. The method as defined in claim 6 wherein any requester is granted access if that requester's supplied additional authentication information matches with authentication information previously stored for one of said authorized users associated with said alleged identity.

8. The method as defined in claim 6 further including the steps of:

retrieving a previously stored profile for said requester; and stimulating said destination to grant access by said requester to said destination at a predetermined level, said predetermined level being determined from said profile, said predetermined attributes of said particular access request joint function, and the result of said comparison.

9. The method as defined in claim 3 further including the steps of:

retrieving a previously stored profile for said alleged identity; and granting access by said requester to said credit account at a predetermined level, said predetermined level being determined from said profile, said joint function and the result of said comparison.

10. The method as defined in claim 9 wherein said predetermined level of access is unlimited access.

11. The method as defined in claim 9 wherein said predetermined level of access is a restricted form of access.

12. A method for use in obtaining access to a credit account for use in the billing of telephone calls placed through a telephone network that controls the establishing of connections among a plurality of telephone stations, said method comprising the steps of:

receiving from a requester a request for access to a particular credit account for charging thereto charges arising from a proposed connection from a first of said plurality of telephone stations to a second of said plurality of telephone stations, said request for access specifying said first and second of said plurality of telephone stations and requiring at least a first level of security processing that collects authentication information and authenticates said requester at least to said first level based only on said collected authentication information before access to said particular credit account may be granted;

making a determination, as a joint function of at least (i) the type of said first telephone station (ii) the location of said second telephone station and (iii) said requester having been authenticated to said first level, that additional security processing beyond said first level is required before access to said particular credit account can be granted; and prompting said requester, only when said additional security processing is required, to provide additional authentication information beyond that collected from said requester in the satisfying of said first level of security processing.

13. A method for use in obtaining access to a credit account for use in the billing of telephone calls placed through a telephone network that controls the establishing of connections among a plurality of telephone stations, said method comprising the steps of:

receiving from a requester a request for access to a particular credit account for charging thereto charges arising from a proposed connection from a first of said plurality of telephone stations to a second of said plurality of telephone stations, said request for access specifying said first and second of said plurality of telephone stations and requiring at least a first level of security processing that collects authentication information and authenticates said requester at least to said first level based only on said collected authentication information before access to said particular credit account may be granted;

making a determination, as a joint function of at least (i) the type of said first telephone station (ii) the cost of said call and (iii) said requester having been authenticated to said first level, that additional security processing beyond said first level is required before access to said particular credit account can be granted; and prompting said requester, only when said additional security processing is required, to provide additional authentication information beyond that collected from said requester in the satisfying of said first level of security processing.

* * * * *